UNITED STATES PATENT OFFICE.

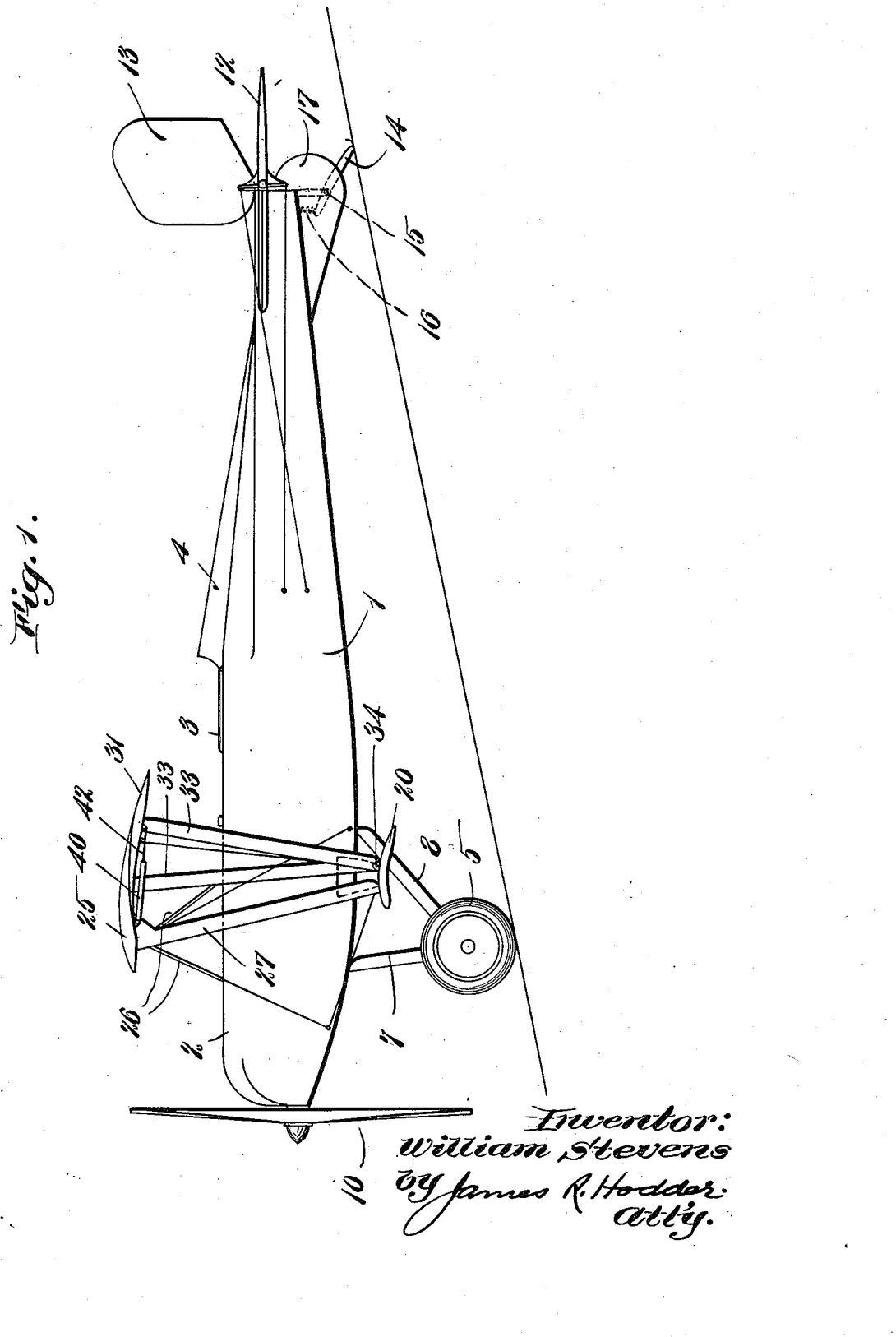

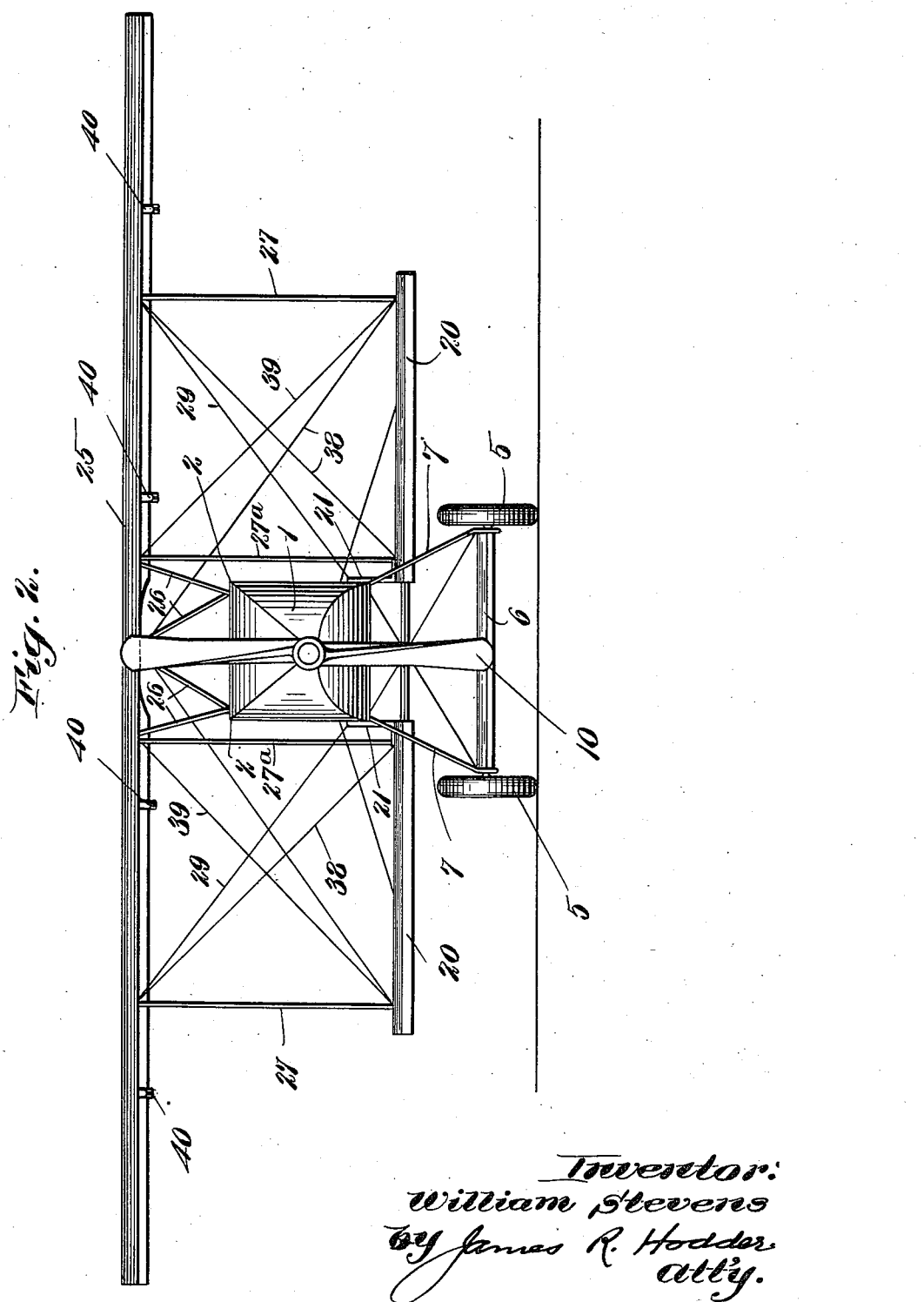

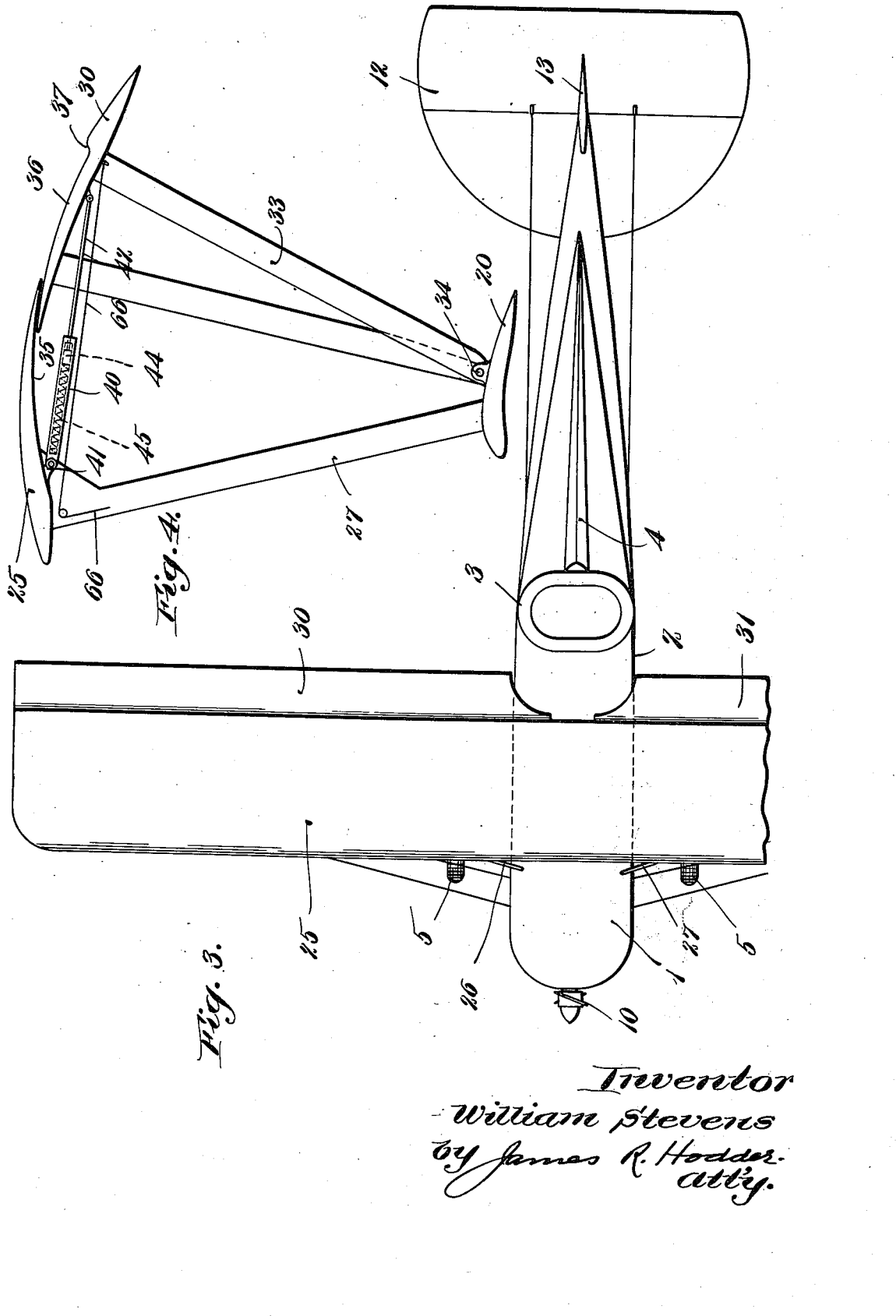

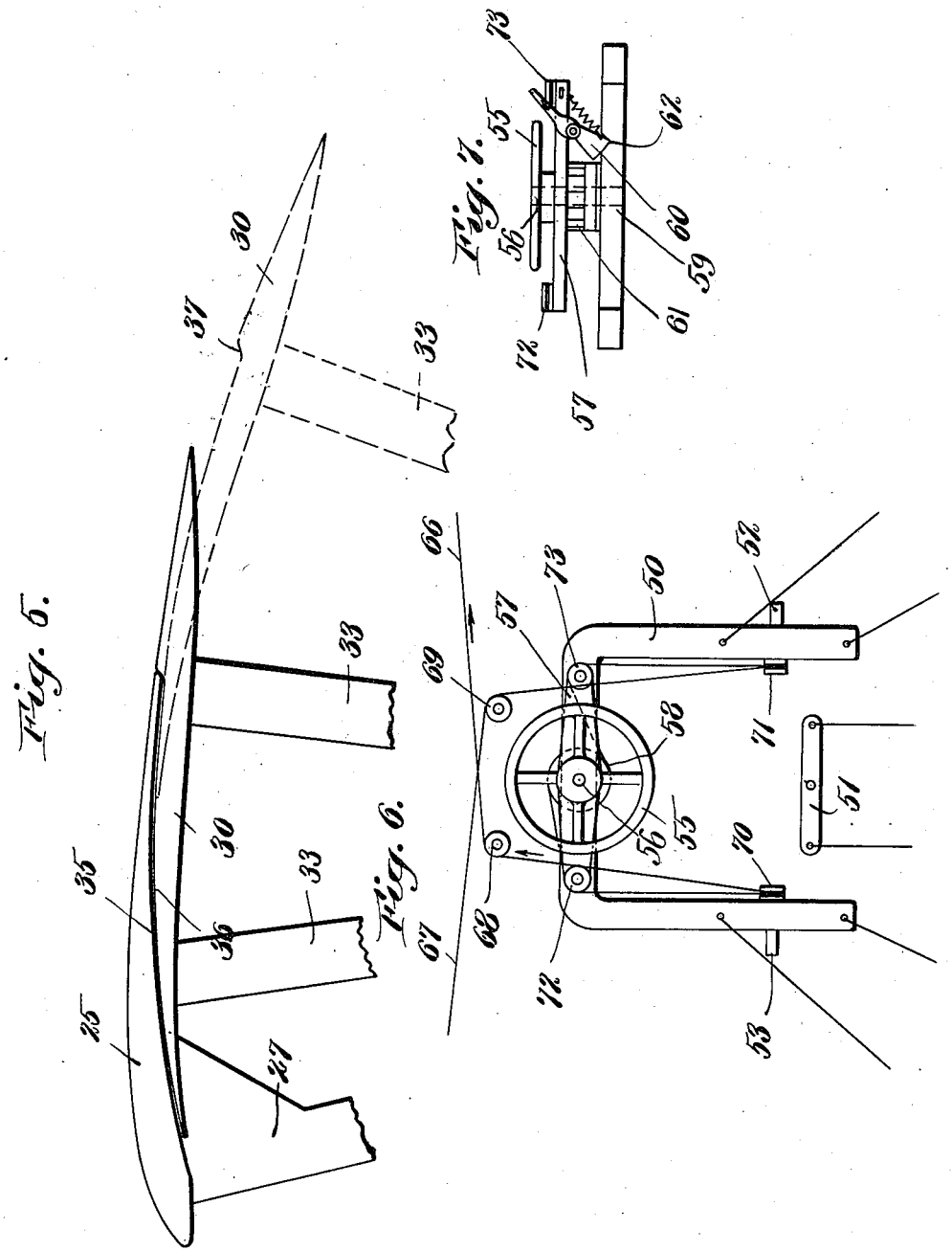

WILLIAM STEVENS, OF BOSTON, MASSACHUSETTS.

AEROPLANE.

1,413,553. Specification of Letters Patent. Patented Apr. 18, 1922.

Application filed March 18, 1918. Serial No. 222,997.

*To all whom it may concern:*

Be it known that I, WILLIAM STEVENS, a citizen of the United States, and resident of Boston, in the county of Suffolk and State of Massachusetts, have invented an Improvement in Aeroplanes, of which the following description, in connection with the accompanying drawings, is a specification, like letters on the drawings representing like parts.

My present invention is an improved aeroplane and the object of the invention is to improve and perfect the handling, control and operation of an aeroplane by means affording variations, changes and adjustments in the wing area, camber, and angle of incidence, during flight.

Heretofore the proper proportioning of the power and speed of motor, area and camber of the wings or planes, has presented considerable difficulty, a relatively large wing area and a predetermined camber and angle of incidence being desirable for quick ascension, whereas an entirely different wing area, camber and angle of incidence, was desirable for high speed and to maintain horizontal flight when ascended. A further difficulty with an aeroplane designed for high speed and consequently with a relatively small wing area, was that such an aeroplane was most efficient only at high speed and could not maintain its flight at a relatively slow speed, but was extremely limited in speed range, its minimum speed being relatively high.

My present invention obviates the difficulties above briefly outlined and provides means which will enable the operator of an aeroplane to control his wing area at any time during flight. Thus I provide means enabling an increased wing area for starting and ascending, and when ascended permit the wing area to be decreased for greater speed in flight. A further feature of my invention consists in the provision of means to also vary the camber of the wings, providing a camber of increased efficiency for ascending, together with the larger wing area, and equally enabling the camber to be reduced when the wing area is reduced for greater speed or flight ahead, and increased efficiency. Furthermore, my invention not only contemplates the control and adjustment of wing area and camber, each for its greatest efficiency during any particular moment of flight, but also consists in means constituting a similar variation and control of the angle of incidence, thus enabling a three-fold adjustment. Consequently, at the inception of flight, a large wing area with increased camber and angle of incidence, all suited for the quickest and most efficient ascension with the motor power and speed of the aeroplane, are provided. When desired height is reached, the wing area, camber and angle of incidence are under control so as to be altered for horizontal flight at greater speed. Or if a slower speed is desired, the increased wing area can be maintained while the motor speed is reduced, thus permitting a slower speed while maintaining flight, and, or course, a large range between slow speed and high speed. This adjustability and control, and with efficient wing areas and angle of incidence for different stages in the range of operations, gives a greater capacity for handling the aeroplane than heretofore, when a fixed proportion between wing area and motor was present. Thus, for example, an aeroplane embodying my invention, when attacking an enemy, may increase wing surface, angle of incidence, and camber, and rise very quickly, thereby obtaining the advantage of position over an enemy aeroplane, and when thus at a greater height may decrease wing area and accelerate speed to overtake the enemy plane. Great efficiency in maneuvering is thus possible with my invention, and this capability is obtained mainly without relying upon the use of rudders, which, of course, decrease speed and efficiency, and act mainly as drags.

A still further important feature of the present invention consists in the practicability of varying the wing surfaces to maintain lateral equilibrium, the increasing of the wing area, camber and angle of incidence on one side, and simultaneously decreasing the wing area, angle and camber on the other side, effecting a much quicker righting action than has heretofore been possible with fixed planes having provision for warping the wing tips or by the use of ailerons. This feature of control is most important, and may be utilized solely for balancing and independently of the features above explained for controlling wing area for better maneuvering during flight. I have provided means which will utilize this balancing feature at any time and position during the range of adjustment for the increasing or decreasing of the wing areas and camber, so that there is at all times provision for lateral balancing and control, whether the wing area is at maximum or minimum or at any intermediate position.

In carrying out my invention I find that in an aeroplane with a normal spread of one hundred and fifty square feet of surface, I can secure an enlargement of such area to a total increased capacity of two hundred square feet, simultaneously altering the camber as well as the angle of incidence and at all times maintaining the provision for lateral balancing by increasing one wing area and simultaneously decreasing the opposite wing area, to maintain lateral equilibrium. To this end I provide two wing sections adapted to slide or house together, when thus in folded position presenting the most efficient wing area and camber for the maximum forward flight. One of these wing sections, preferably the rearward section, is movable, being carried on pivoted struts and movable toward and from a rigid wing section. I prefer to arrange such movable sections at each side of the aeroplane, and preferably also extend the same substantially throughout the entire length of the rigid wings, at each side of the body. I also arrange controls which will manipulate these wing sections rearwardly and forwardly, preferably leading the same directly to the steering wheel, so that the wing areas can be instantly controlled and adjusted. I also provide for having controlling means which will automatically decrease one wing area while increasing the opposite wing area, to give the lateral balancing control, such control being operable at all times whether the wings are at maximum or minimum area.

A further and most important feature of my invention consists in the advantage of practically maintaining the center of pressure or lift of the wings in the same relative position while varying the wing area, thus automatically compensating or counterbalancing the change incident to the varying wing area. By increasing the area of a wing rearwardly, the center of lift will, ordinarily, move rearward and thus would throw the entire machine out of balance. Also, by increasing the angle of incidence, without altering the area, the center of lift moves forward, again destroying the equilibrium of the apparatus, but in the opposite direction. In my machine however, by simultaneously increasing the area, rearwardly, and while simultaneously increasing the angle of incidence, the center of lift is practically maintained stationary, these two variable elements approximately counterbalancing each other, and therefore tending to maintain the equilibrium of the aeroplane while thus varying the functions of the wing surfaces. This feature is most important and in practice enables the center of lift to be practically maintained over the center of gravity, although even if there should be any overbalancing in this respect it would be very slight, and, of course, met by the horizontal rudder.

I believe that the provision of practical and easily operable means to increase and decrease wing area during flight is distinctly new and I also believe that means which will simultaneously increase or decrease wing area with appropriate variation in camber and angle of incidence of the wing, is distinctly new, and I wish to claim these features broadly. The control, for lateral balancing, of wing sections movable in the plane of the wing, i. e., positively increasing or decreasing the lifting area and varying the form and angle of a wing, as distinguished from merely changing the angle of a portion of the wing or a small wing section, is a distinct novelty in this art, and therefore I believe I am entitled to claim this feature broadly. Furthermore I consider that the provision of means automatically tending to maintain the center of lift substantially stationary while varying the wing area is broadly novel and is herein so claimed.

While I have illustrated and described herein means for simultaneously varying the wing area, camber and angle of incidence, I believe that the broad idea of varying either one of these, as well as either or all in combination, is novel, and certain of the appended claims are directed to each of these features, as well as combinations of them.

Referring to the drawings illustrating a preferred embodiment of the invention,

Fig. 1 is a side view of my improved aeroplane, showing the wing sections folded or in position for maximum horizontal forward speed;

Fig. 2 is a front view;

Fig. 3 is a plan view with part of one wing section broken away;

Fig. 4 is a fragmentary view illustrating the wing sections in position of greatest spread for quick ascension or horizontal flight at slow speed;

Fig. 5 is a fragmentary detailed view, on an enlarged scale, illustrating different positions of wing area in cross section;

Fig. 6 is a view in elevation of the controlling apparatus; and

Fig. 7 is a detailed view of the controlling wheel and drum.

My invention is applicable to various types of air craft, and various types of wing sections, the drawings showing, for illustrative purposes, a wellknown standard type of aeroplane utilizing the standard U. S. A. wing section No. 1.

The aircraft comprises the body 1, which I prefer to form in a streamline contour, and with the bottom, sides and top of the body presenting substantially straight surfaces, joining each side and top substantially in a right angle, as shown at 2, 2. Thus the combing 3 for the operator is substantially flush with the sides presenting no resistance, and immediately back of the operator's seat, in alinement with the head and helmet, is a streamline ridge 4 to eliminate the drag and suction created at high speeds. Landing wheels 5, 5, mounted on an axle in the usual manner, the axle passing through a brace 6, which latter I also prefer to form in streamline cross-section, carried by braces 7, 7, and 8, 8, are of ordinary construction, the propeller 10 and rudders 12 and 13 for vertical and horizontal control, are also of usual construction. A rear landing strut 14, pivotally mounted at 15 and yieldingly controlled by a spring 16, is arranged at the rear portion. The main part of this strut, pivot and spring I prefer to enclose by a brace and covering 17, to still further eliminate friction and drag of the air at high speeds.

In applying my invention to an aeroplane of the type herein illustrated, I prefer to form the upper or main wings in two sections or portions, which sections are so braced, mounted, and controlled as to enable a relative sliding adjustment between the two sections, said two sections being constructed to overlap at all times and to practically fold together in the form of the desired wing section for high speed flight, both sections being supported, braced and held so as to permit this sliding movement without the adjacent surfaces being actually in contact, but still so closely adjacent as to present, in effect, a continuous air resistant surface. To this end I provide the lower transverse wings 20, 20, at either side of the body 1, and rigidly secured thereto, also of suitable camber and form for forward flight at the highest speed for which the aeroplane may be built, this lower wing being braced in any usual or desired manner, as by angle irons 21, 21, bracing struts and the like. The upper wing comprising the main forward and rigid section 25, of suitable spread, is secured in rigid and braced position relatively with the body 1 and lower wings 20 by struts 26, 26, to the body, and 27, 27, to the lower wings 20, 20. These struts 27 are preferably at the outermost ends of the lower wings 20, as clearly shown in Fig. 2, the struts 27a extending from the angle irons 21 to the inner rigid wing sections, as clearly shown in Fig. 2. These struts I also prefer to make with a streamline form in cross-section and I further brace the wings by usual steel guys 29. Cooperating with the upper fixed wing 25 are two relatively movable wing sections, 30 and 31 one at each side of the body 1, these movable sections being rigidly secured to struts 33, which are pivoted on the lower wing portions 20 as shown at 34, said struts being directly in longitudinal alinement with the forward fixed struts 27 and being in pairs at the ends of the lower wings 20, 20. The movable wing sections 30 and 31 are formed to cooperate with the forward or fixed wing section 25 and when both sections are in closed or folded position, as shown in Fig. 5, the combined wing presents the standard wing section U. S. A. No. 1, as above explained, with camber and area for high speed horizontal flight. When the wing sections 30 and 31 are opened or moved rearwardly relatively with the fixed wing section 25, as illustrated in Fig. 4, and as shown in dotted lines in Fig. 5, an increased area is presented, as well as an increased camber and different angle of incidence, in the latter position the effective form of the combined wing area 25 with the extended sections 30 and 31 giving an efficient spread for ascending, or an equally efficient spread for maintaining horizontal flight at lower motor speed. This construction is attained by pivoting the struts 33 at appropriate points 34 on the lower wing sections 20, and in having the adjacent surfaces 35 of wing 25 and 36 of the wing sections 30 and 31 in the arc of a circle with the pivot 34 as the center. These arcs 35 and 36 are as closely adjacent as possible to form them without actually being in contact, so that the relative movement of the wing sections 30 and 31 is not retarded by any frictional contact with the fixed wing, thereby permitting ease, facility and speed of manipulating the movable wing portions, as will be described. If desired, I may afford a stop or limit to the folding of the movable sections by a slight shoulder 37, in the upper part of the movable sections, this shoulder, in actual practice, being unobjectionable, as it is on the upper surface of the wing section in that portion where the rarefaction has no dragging effect on the wings. Suitable bracing guys and struts as shown at 38 and 39 are arranged for the movable sections extending from adjacent the respective pivot points 34 of each strut 33 to the wing.

With the wing construction as thus described, I provide means which will enable the operator to move either wing section 30 or 31 and preferably to move them together simultaneously, either outwardly to increase arc and camber, or inwardly to decrease the same, depending upon motor speed, flight and maneuvering as has been described. I also provide means which will enable the operator to produce a relative movement of these wing sections 30 and 31, but preferably in opposite directions and simultaneously to provide lateral balance for equilibrium, thus increasing the wing area by moving the section 30 rearwardly and simultaneously decreasing the opposite wing area by moving the section 31 inwardly, thus giving a greater lift on one side and decreasing lift on the other to maintain lateral equilibrium, entirely independent of rudder action. The feature just described is preferably so arranged as to be employed at all times, irrespective of whether or not the movable wing sections are at the extreme expanded position, folded position, or at any point intermediate thereof.

In order to simplify the operation of increasing or decreasing the wing area, I prefer to provide resilient means as for example a plurality of spring pressed plungers, pivotally connected to the fixed wing section 25 and adjacent movable sections 30 or 31, tending to normally force the movable sections apart, and counteracting these spring plungers I provide flexible lines, i, e., wires to draw the wing sections inwardly, or toward folded position, against the tension of the spring pressed plungers. Consequently the operator controls the spread of wing simply by drawing in or winding up these lead wires on a reel or by releasing the same, allowing the spring pressed plungers to expand the wing area. This spring actuated device comprises a plurality of members, each consisting in a barrel 40 pivoted at 41 to the forward or fixed wing 25, and a stem 42 pivoted at 43 to the movable wing section, each stem 42 terminating in a sliding position as shown at 44 in dotted lines, Fig. 4, a coiled spring is indicated at 45 in dotted lines, normally tending to force the stem outwardly, but housing within the cylinder 40 when the wing section 30 is drawn into folded position. I prefer to have a plurality, preferably a pair of such spring plungers operating on each wing section, thereby relieving any tendency of binding, twisting, or torsional strains. I also prefer to have the lead lines which are arranged to draw in the wing section, lead from a plurality of points, preferably adjacent the spring devices just described, also for the purpose of eliminating undue strain, two such lead lines being readily united into a single line when the same are brought down to the drum on the controlling wheel adjacent the operator's seat.

As illustrated in Figs. 6 and 7 I have shown a method of control which will now be described. This control comprises the usual pivoted steering frame 50 for the hand wheel and 51 for the foot steering, the frame 50 being pivoted at 52 and 53 to provide a rocking motion to control the rudders in the usual manner. Mounted on the frame 50 is the steering wheel 55, having its shaft 56 extending through a lever 57 and carrying a drum 58 rigidly secured thereto, the shaft 56 extending downwardly into a suitable journal bearing 59 in the frame 50. A latch 60 is mounted in the lever 57 in position to be sprung into and engage the teeth 61 carried on the shaft 56, so as to lock said lever in rotative movement with the shaft 56 and wheel 55, reverse movement of the latch 60 releasing the lever therefrom and simultaneously engaging a recess 62 in the frame 50, so that said lever will be locked on the frame 50 and free of the wheel 55, permitting the latter to turn and rotate the drum 58, around which the lead lines 66 and 67, extending to the wing sections 30 and 31, to move the same inwardly against the tension of the spring devices already described, are wound. Said lines are so secured and wound upon the drum 58 that relative movement of the wheel 55 will simultaneously move each wing section inwardly, or releasing it, will permit same to be moved simultaneously outwardly by the spring pressed plungers 40 and 41. I also prefer to utilize these leadlines 66 and 67 not only to control the adjustment of the movable wing sections when it is desired to substantially vary the speed, camber, and angle of incidence, but I also utilize these same leadlines to effect the alternate and opposite sliding movement of the wing sections 30 and 31 to afford the lateral balancing action. To this end the leadlines 66 and 67 are brought over suitable pulleys 68 and 69 respectively, in any desired position, and thence lead to pulleys 70 and 71, mounted respectively at the pivot points of the frame 50, the same being led to pulleys 72 and 73 respectively at the ends of the quadrant 57, and from these points to the drum 58 where they are wound thereabout in opposite directions and permanently secured thereto. The operation of this control results in enabling the lines 66 and 67 to lead evenly and uniformly from the drum 58 irrespective of the angular position in which the frame 50 may, at the time, be moved, because these lines extend toward and from the pivot centers 52 and 53 of said frame. With the latch 60 locking the lever 57 into engagement with the shaft and wheel 55, a slight relative movement of this wheel moves the wing sections 30 and 31 simultaneously in opposite directions, i. e., drawing one in against the compression of the springs in the cylinders 40 and releasing the other, permitting it to move outwardly, by the action of its spring devices. This gives constant control for lateral balancing. To vary the area of wing spread, the latch 60 is moved to release the lever 57 from the shaft carrying the wheel 55, locking said lever on the frame 50 and permitting the operator to quickly rotate the wheel 55, winding in the leadlines 66 and 67 simultaneously to decrease wing area, or releasing them simultaneously to increase wing area, whereupon the latch 60 is snapped back into position, thus locking the lever 57 to the wheel and further rotative movement of the wheel resulting in the movement of the wing sections oppositely and simultaneously for balancing, while permitting at all times the frame 50 to be manipulated on its pivots for control of the horizontal rudders, the foot bar 51 being, at all times, free and clear and usually operating the vertical rudder. By crossing the wires 66 and 67 as shown in Fig. 6, the established practice of moving the wheel 55 to the right or left for corresponding lift action, as well as strength, is secured.

It will thus be seen that I provide mechanism to vary the effective area of the wing surface during flight, to vary, by increasing or decreasing the spread and area, and also to simultaneously change the camber and angle of incidence for most efficient action appropriate to the spread of wing being made and as an assistance in the resultant action of the wing spread. I also enable the operator to utilize this varying wing spread at either side of the body for controlling lateral equilibrium, and effect such a control much quicker than has formerly been possible, because not only of the variation in wing spread but also of the increased efficiency in camber and incidence, thus manipulating the three elements of lift which it is possible to use without effecting any drag on the mechanism through rudder action. If desired, this sliding wing section construction could be employed solely for lateral stability, the sliding sections being made of relatively small area for this purpose. Furthermore, the provision of simultaneously moving the wing sections rearwardly while increasing the angle of incidence, produces a resultant, first by throwing the center of lift rearwardly, because of the increased area, and simultaneously tending to throw the center of lift forwardly because of the increased angle of incidence, thereby maintaining the center of lift of the combined wing sections at a substantially fixed point, each of these actions counterbalancing each other, thus negativing the disturbing effect of either on equilibrium of the aeroplane.

All this possibility of control, variation, lift and area is under the instant handling of the operator, and by the standard type of controlling frame in the body, so that the operator is not burdened with additional handles, levers or the like, and may retain one hand on the steering wheel at all times. It will be appreciated that the great advantage of the wide degree of variability due to the variable control at will by the pilot of three elements each cooperating to aid the other, all moved and adjusted simultaneously, and by a single motion of the control, is accomplished by my invention. Heretofore the maximum velocity in flight was limited by the minimum velocity necessary to attain the initial "get-away" or ascension, but my invention enables an ascension to be made at the lowest possible minimum speed and thereupon by reducing the camber and angle of incidence of the wing areas, a maximum velocity in flight will be obtained which it would have been impossible to secure by prior devices or if the areas, camber and angle of incidence were fixed elements.

My invention is further described and defined in the form of claims as follows:

1. In an aeroplane, the combination of a fixed wing section having a constant bottom camber, a movable wing section having a constant bottom camber different from the bottom camber of the fixed wing section and the top camber equivalent to the bottom camber of said fixed wing section, means for pivotally mounting said movable wing section and means for moving said movable section on its pivotal mounting into parallelism with said fixed section with the top camber of the movable section and bottom camber of the fixed section in practical engagement with each other, whereby a combined unitary aerofoil having a bottom camber substantially that of the bottom camber of the movable section is obtained.

2. In an aeroplane, the combination of a fixed wing section having a constant bottom camber, a movable wing section having a constant bottom camber different from the bottom camber of the fixed wing section and the top camber equivalent to the bottom camber of said fixed wing section, means for pivotally mounting said movable wing section and means for moving said movable section on its pivotal mounting relatively to the fixed section, to bring the front of the movable section into alinement with the rear of the fixed section, whereby a resultant combined aerofoil having a bottom camber different from the bottom camber of either section is obtained.

3. In an aeroplane, an aerofoil comprising a relatively fixed and a relatively movable section, each having a different camber, the top surface of the relatively movable section cut away to a curvature substantially equivalent to the curvature of the lower surface of the relatively fixed section, whereby the relatively fixed section may be superimposed on the relatively movable section to form an aerofoil of different camber, angle of incidence and effective area than the separate sections.

4. In an aeroplane, the combination of a fuselage, an aerofoil on either side thereof comprising a relatively fixed and a relatively movable section, each having a different camber, the top surface of the relatively movable section cut away to a curvature substantially equivalent to the curvature of the lower surface of the relatively fixed section, whereby the relative fixed section may be superimposed on the relatively movable section to form an aerofoil of different camber, angle of incidence and effective area than the separate sections, and means for moving said sections relatively to each other to simultaneously alter the camber, the angle of incidence, and effective area of the aerofoils on either side of the fuselage.

5. In an aeroplane, the combination of a wing having a front part which is fixed relatively to the aeroplane, and a rear part which is movable relatively to said front part, and struts extending downwardly from said rear part and connecting said rear part with a fixed part on said aeroplane and guiding the movement of said rear part.

6. In an aeroplane, the combination of a wing having a front part which is fixed relatively to the aeroplane, and a rear part which is movable relatively to said front part, struts rigidly connected at their upper ends with said rear part and at their lower portions with a fixed part of said aeroplane, said struts being movable about their connections with the fixed part of said aeroplane to guide the rear part of said upper wing in its movement, and means for controlling the position of the rear part of said wing relatively to said front part.

7. An aeroplane having an upper wing provided with a fixed front part and a rear part which is movable toward and from said fixed part, struts extending downwardly from said movable rear part and having pivotal connections at their lower ends with the aeroplane, and cross wires arranged between said struts and connected at their upper ends to said movable part and having their lower ends secured concentric with said pivotal connection, whereby said rear part, said struts and said cross wires are adapted to swing about said pivotal connections.

In testimony whereof, I have signed my name to this specification.

WILLIAM STEVENS.